(12) United States Patent
Deng

(10) Patent No.: US 7,947,173 B2
(45) Date of Patent: May 24, 2011

(54) SEAWATER FILTER

(76) Inventor: Chung-Jung Deng, Daya Township (TW)

(*) Notice: Subject to any disclaimer, the term of this patent is extended or adjusted under 35 U.S.C. 154(b) by 104 days.

(21) Appl. No.: 12/413,567

(22) Filed: Mar. 29, 2009

(65) Prior Publication Data
US 2010/0243548 A1   Sep. 30, 2010

(51) Int. Cl.
*B01D 21/26* (2006.01)
(52) U.S. Cl. ............ 210/170.05; 210/170.11; 210/512.3
(58) Field of Classification Search ............. 210/170.05, 210/170.09, 170.11, 242.1, 512.3
See application file for complete search history.

(56) References Cited

U.S. PATENT DOCUMENTS

| | | | |
|---|---|---|---|
| 4,111,809 A * | 9/1978 | Pichon | 210/242.1 |
| 5,128,033 A * | 7/1992 | Eberhardt | 210/512.3 |
| 6,599,422 B2 * | 7/2003 | Constantine et al. | 210/512.3 |
| 7,678,266 B2 * | 3/2010 | Sun et al. | 210/170.05 |
| 2002/0104797 A1 * | 8/2002 | Djelouah | 210/512.3 |
| 2004/0256312 A1 * | 12/2004 | Gomez | 210/512.3 |

* cited by examiner

*Primary Examiner* — Christopher Upton
(74) *Attorney, Agent, or Firm* — Wang Law Firm, Inc.; Li K. Wang

(57) ABSTRACT

A seawater filter is disclosed. A driving unit is disposed on a main body and penetrates into the accommodating space thereof with a rotating axis. The rotating axis is provided with pumping fans, centrifugal fans, and pressurizing fans. A floating object is interposed between the driving unit and the main body. The main body has fresh water inlets, seawater inlets, and seawater outlets.

8 Claims, 8 Drawing Sheets

SEAWATER FILTER

BACKGROUND OF THE INVENTION

1. Field of Invention

The invention relates to a seawater filter and, in particular, to a device that filters seawater centrifugally.

2. Related Art

Please refer to FIG. 6 for a conventional seawater filter 8. A water supply pump 81 draws seawater to a pre-filter 82 to filter out impurities in larger sizes. The seawater is then transmitted to a post-filter 83 that can filter out smaller impurities. Afterwards, a pressurizing pump 84 transports the filtered seawater to a reverse osmosis (RO) system 85 to turn it into fresh water.

Although the above-mentioned seawater filter can desalinate seawater into fresh water, large and small impurities accumulate on the filtering materials of the filters 81, 82 during the desalination process. One then has to frequently replace the filtering materials to avoid clogging. The high cost for filtering materials is thus a primary problem.

Please refer to FIG. 7 for another conventional seawater filter 91. It involves a heating unit 911, a desalinating unit 912, and a purifying and distilling unit 913 working repeatedly and cyclically. Through multiple desalination steps of a separating and reducing device (not shown) in the desalinating unit 912 and multiple filtering and purifying processes of a distiller (not shown) in the purifying and distilling unit 913, components in seawater are decomposed to the tiniest particles, thereby achieving the desalinating, filtering, and purifying effects.

However, such a seawater filter requires the use of the heating unit 911. The purifying and distilling unit 913 then collects water vapor. In this case, the overall cost of the device is the primary problem.

Please refer to FIG. 8 for yet another conventional seawater filter 92. Several connected desalinating layers 922 are disposed inside a centrifugal cylinder 921. Each of the desalinating layers 922 includes a stainless steel cathode, a graphite anode, and an electrode screen. Seawater is injected via the top water inlet of the centrifugal cylinder 921. The stainless steel cathode and the graphite anode throw out objects adhering thereon as they rotate. Through the effects of an electric field and centrifugal force, seawater passes through each of the desalinating layers 922 in the centrifugal cylinder 921. Each layer has an electric field produced by the electrodes and a centrifugal force produced by rotation. Therefore, all the positively charged ions in seawater move towards the cathode, while all the negatively charged ions move towards the anode. The electrode screen filters the ions, so that the positively and negatively charged ions in seawater are reduced. Eventually, the seawater is desalinated to fresh water.

However, such a conventional seawater filter has to have the components of stainless steel cathodes, graphite anodes, and electrode screens. The electric field is generated by an electric field. Thus, it has even higher device and operating costs than the previously mentioned two conventional seawater filters.

SUMMARY OF THE INVENTION

In view of the foregoing, an objective of the invention is to provide a new seawater filter. Seawater enters an accommodating space of a main body through several inlets on a first end surface of the main body. The operation of a centrifugal fan produces a vortex in the seawater inside the main body. Materials with densities larger than water are thrown outwards, while those with densities smaller than water are closer to the rotating axis. The liquid near the central portion has less impurities and flows out of a fresh water outlet. The liquid in the portion with a larger density has more impurities and flows back into the sea via a seawater outlet. This achieves the goals of simple operations and low costs. Moreover, it saves the consumption of filtering materials.

To achieve the above-mentioned objective, the invention includes: a main body, a driving unit, and a floating body.

The main body is hollow and has a first end surface and a second end surface on its both ends, respectively. Each of the end surfaces is closed so that an accommodating space is formed inside the main body. The first end surface has at least two seawater inlets. A hollow duct is disposed at the center of the second end surface. The duct penetrates via the second end surface into the accommodating space. The outer side of the duct on the second end surface has at least two seawater outlets. The inner side of the duct has at least one fresh water outlet for filtered fresh water to flow out. A fresh water pipeline outside the main body connects to the duct.

The driving unit is disposed on the outer side of the first end surface of the main body. A rotating axis extends from the driving unit towards the central part of the first end surface. The rotating axis penetrates into the accommodating space of the main body. Inside the accommodating space, the rotating axis is disposed with at least one pumping fan, at least one centrifugal fan, and at least one pressuring fan from the seawater inlets towards the seawater outlets. The pumping fan draws and guides seawater from the seawater inlets into the accommodating space. The centrifugal fan throws impurities with larger densities in the seawater outwards. The pressuring fan is disposed inside the duct for guiding fresh water to flow into the fresh water pipeline.

The largest outer diameter of the pumping fan and the centrifugal fan is smaller than the inner diameter of the accommodating space of the main body. The space between the two diameters is a dense water region corresponding to the seawater outlets. The dense water region allows the liquid containing more impurities to flow from top to bottom and out of the seawater outlets. The smallest outer diameter of the pumping fan and the centrifugal fan is larger than the diameter of the duct. The largest outer diameter of the pressuring fan is smaller than the inner diameter of the duct.

The floating body is interposed between the main body and the driving unit to float on the water level. The rotating axis penetrates through the floating body into the accommodating space.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
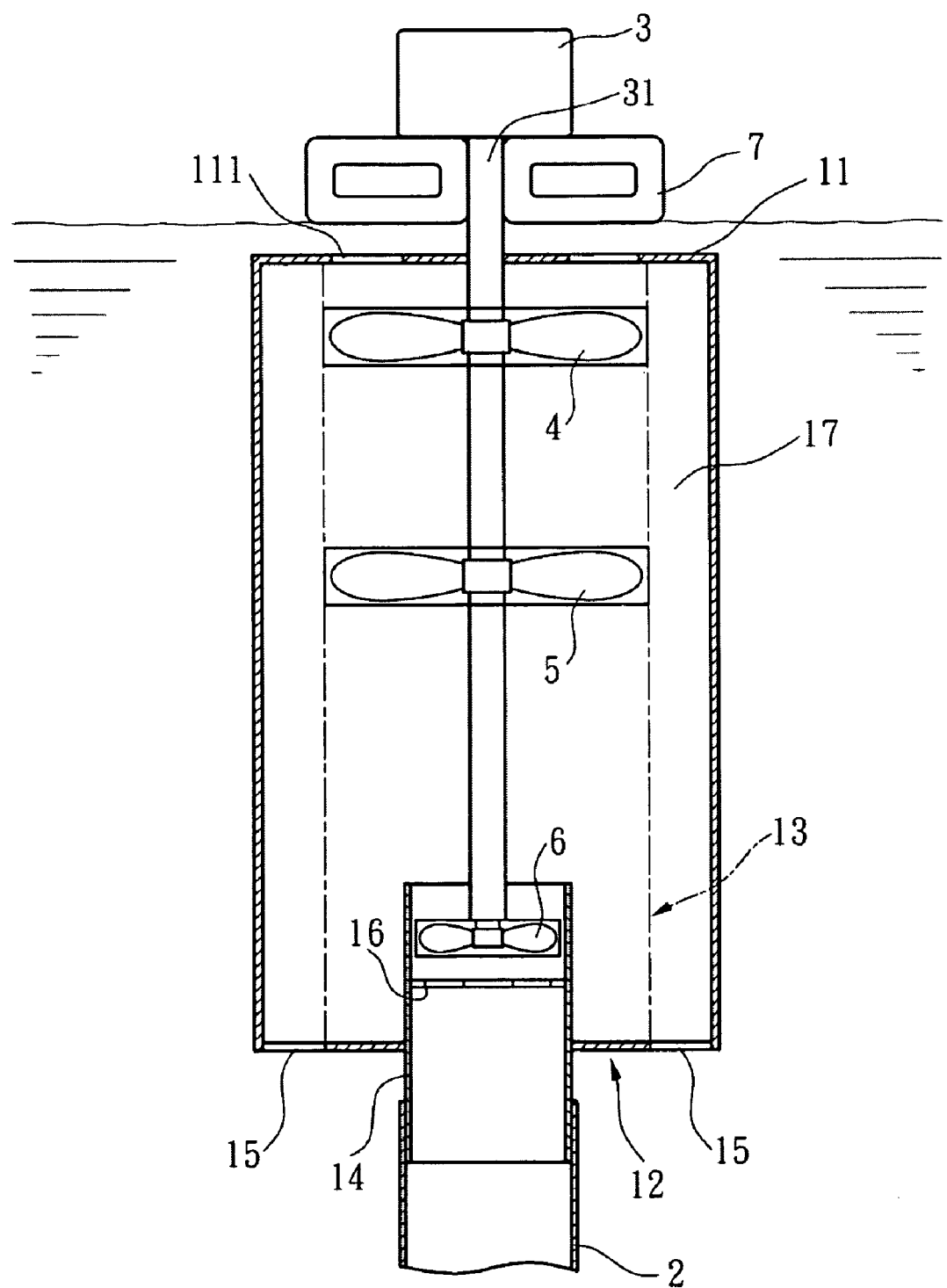
FIG. 1 is a schematic planar view of the invention.
Figure 2:
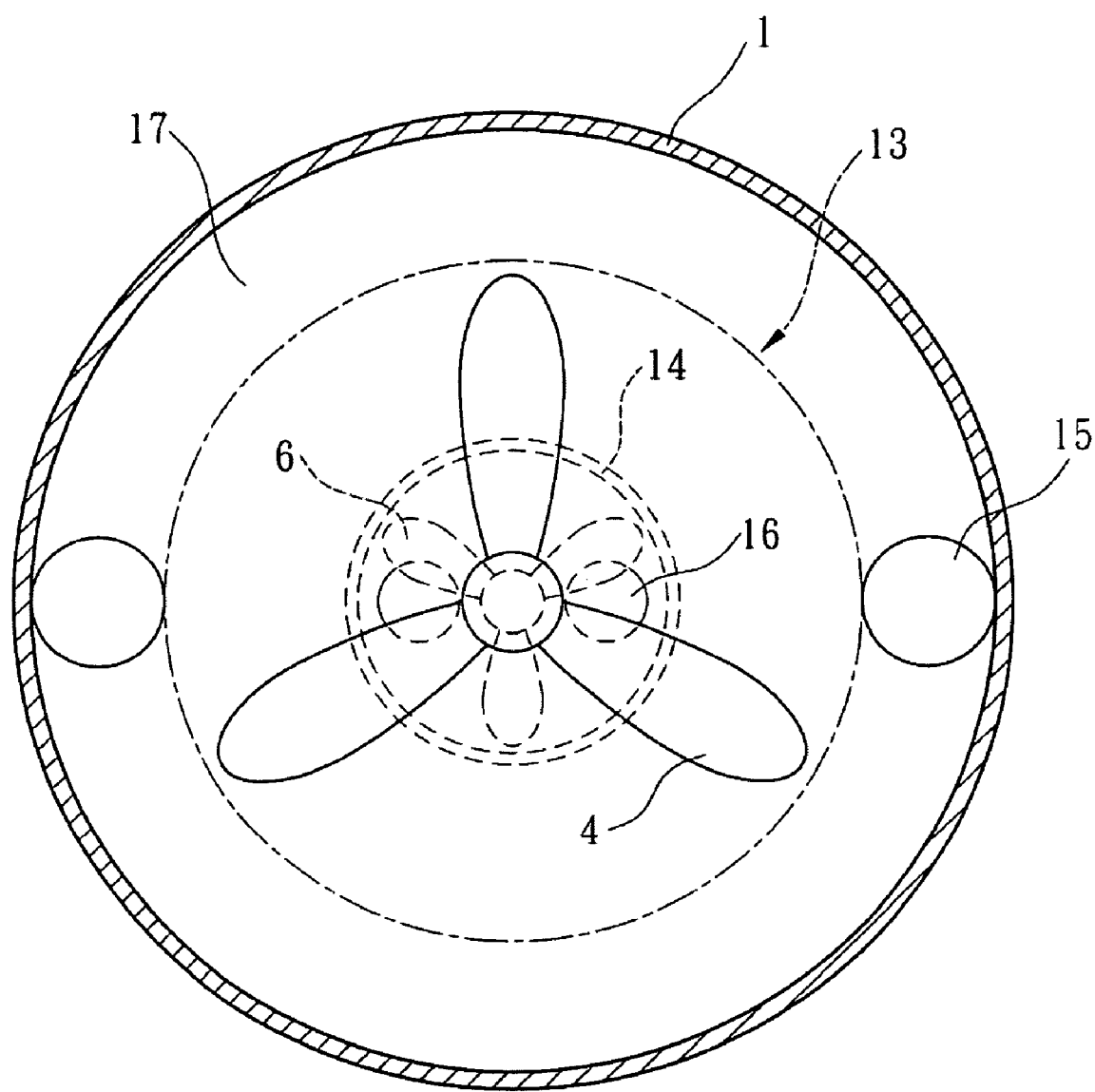
FIG. 2 is a schematic top view of the invention.
Figure 3:
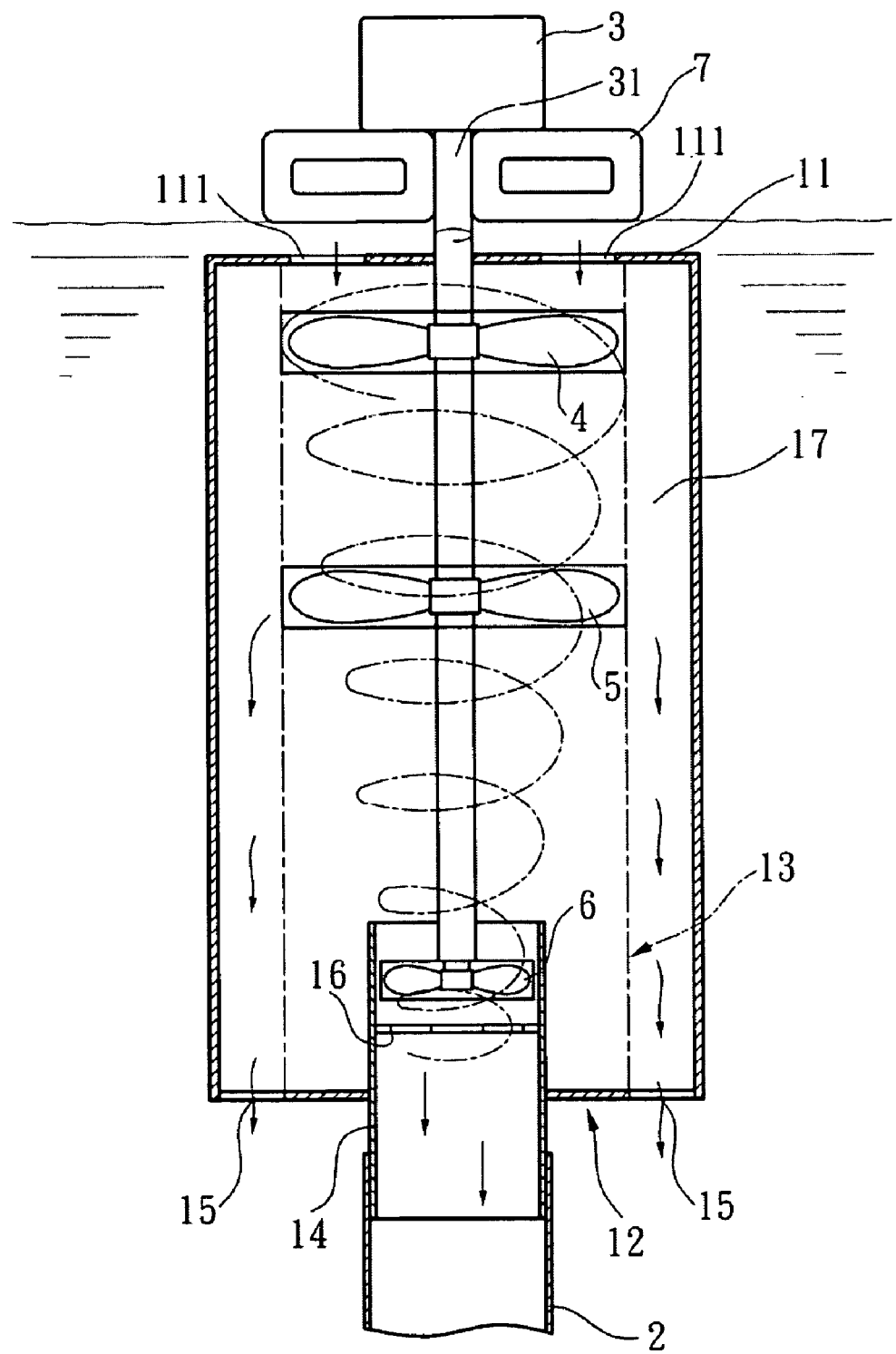
FIG. 3 is a schematic view showing how seawater is desalinated.

Please refer to FIGS. 1 to 3 for an embodiment of the invention. This embodiment is used solely as an example and should not be used to restrict the invention. The seawater filter in this embodiment includes: a main body 1, a driving unit 3, and a floating body 7.

The main body 1 is hollow and has a first end surface 11 and a second end surface 12 on its both ends. Each of the end surfaces 11, 12 is closed to form an accommodating space 13 inside the main body 1. The first end surface 11 has at least two seawater inlets 111. In this embodiment, the two opposite sides of the first end surface 11 are formed with a seawater inlet 111, respectively, for seawater to flow into the accommodating space 13.

A duct 14 is disposed at the center of the second end surface 12 on the main body 1. The duct 14 is also hollow. It penetrates the second end surface 12 into the accommodating space 13. The outer side of the duct 14 on the second end surface 12 has at least two seawater outlets 15. In this embodiment, the two opposite sides of the second end surface 12 are formed with a seawater outlet 15, respectively, for water with high concentration of impurities to flow out of the body 1. The inner side of the duct 14 has at least one fresh water outlet 16. In this embodiment, the two opposite sides of the duct 14 are formed with at least one fresh water outlet 16, respectively, for the filtered fresh water to flow out of the main body 1. A fresh water pipeline 2 outside the main body 1 connects to the duct 14, establishing fluid communications. In this embodiment, the fresh water pipeline 2 is mounted on the duct 14 of the main body 1.

The driving unit 3 is disposed on the outer side of the first end surface 11 of the main body 1. In this embodiment, the deriving unit 3 is a motor. A rotating axis 31 protrudes form the driving unit 3, corresponding to the center of the first end surface 11. The rotating axis 31 penetrates into the accommodating space 13 of the main body 1. The rotating axis 31 inside the accommodating space 13 is mounted in sequence with at least one pumping fan 4, at least one centrifugal fan 5, and at least one pressuring fan 6 from each of the seawater inlets 111 towards each of the seawater outlets 15. In this embodiment, the rotating axis 31 inside the accommodating space 13 is mounted in sequence with one pumping fan 4, one centrifugal fan 5, and one pressuring fan 6. The pumping fan 4 draws and guides seawater from the seawater inlets 111 into the accommodating space 13. The centrifugal fan 5 throws impurities with densities larger than seawater outwards using the centrifugal force. The pressurizing fan 6 is disposed inside the duct 14 for guiding the fresh water out via the fresh water pipeline 2.

Besides, the maximum outer diameter of the pumping fan 4 and the centrifugal fan 5 is smaller than the inner diameter of the accommodating space 13 of the main body 1. The space between the two diameters is defined as a dense water region 17, corresponding to the seawater outlets 15. The dense water region 17 allows dense water with a high impurity concentration to flow from top to bottom, leaving via the seawater outlets 15. The minimum outer diameter of the pumping fan 4 and the centrifugal fan 5 is larger than the diameter of the duct 14. The maximum outer diameter of the pumping fan 6 is smaller than the inner diameter of the duct 14.

The floating object 7 is interposed between the main body 1 and the driving unit 3 for the driving unit 3 to float on the water level. The rotating axis 31 penetrates through the floating object 7 into the accommodating space 13.

According to the above description, the pumping fan 4 draws the seawater into the accommodating space 13 of the main body 1 via the seawater inlets 111 on the first end surface 11. The operation of the centrifugal ran 5 generates a vortex in the seawater inside the main body 1. Materials with larger densities are thrown out of the fan, while those with smaller densities stay closer to the rotating axis 31. Therefore, the disclosed device can throw out impurities with larger densities using the centrifugal force, thereby reducing the impurity concentration in the central region. The cleaner water thus flows out via the fresh water outlet 16 and the fresh water pipeline 2. The dense water with a higher impurity concentration in the dense water region 17 flows back to the ocean via the seawater outlets 15. Thus, the invention can desalinate seawater.

It is not difficult to see the advantages of the invention. The seawater filter has simple components. No filtering material is required in this embodiment. Therefore, the costs for equipment and filtering materials can be saved. Moreover, unlike conventional desalinating devices, the invention does not require an electrical current for further processing. In comparison, the desalinated device is more economic and convenient.

Figure 4:
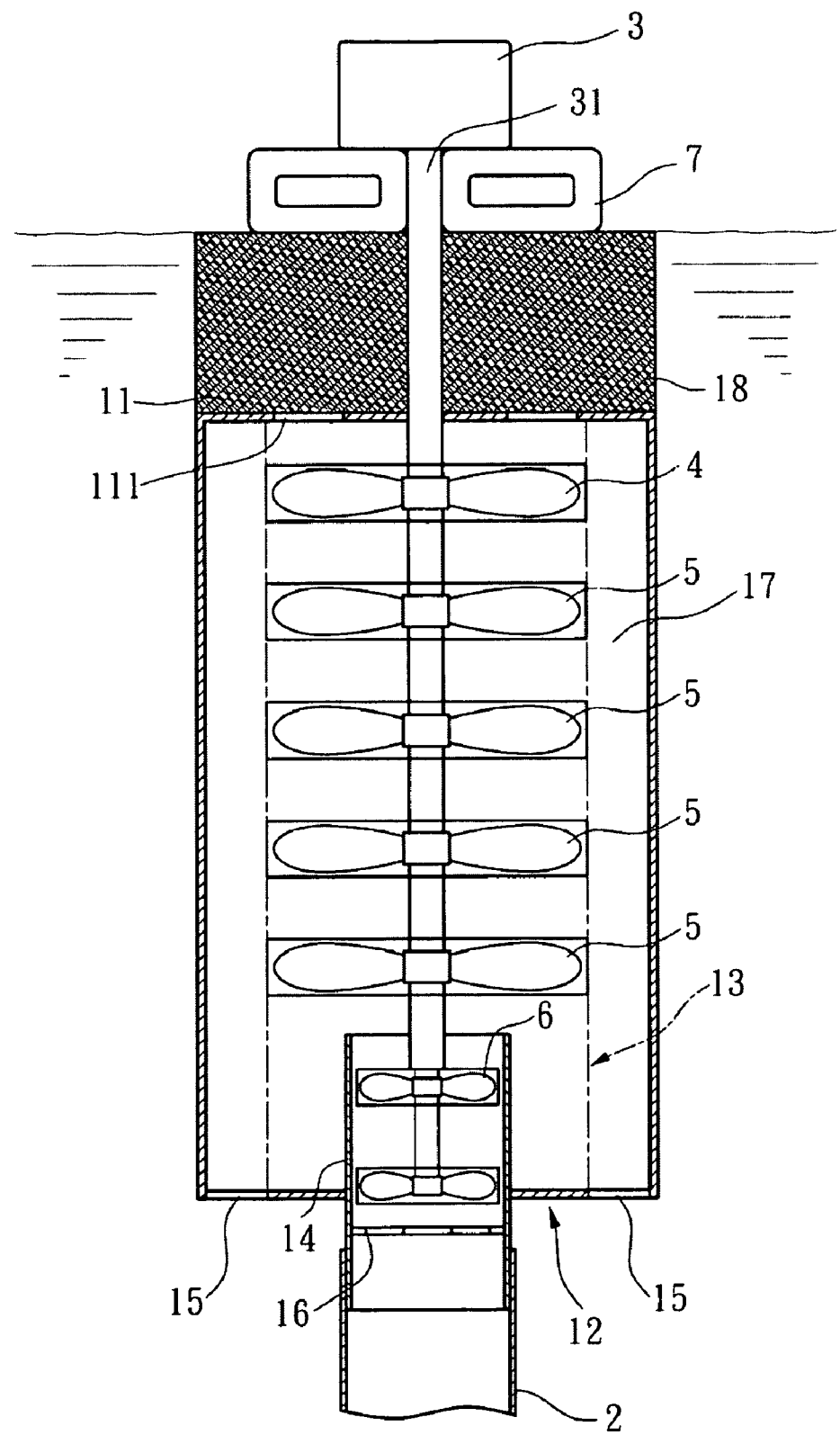
FIG. 4 is a schematic planar view of the second embodiment of the invention.

The invention of course has many other embodiments that differ from the above one in details. Please refer to FIG. 4 for a second embodiment of the invention. A filtering material 18 for filtering out impurities is interposed between the first end surface 11 of the main body 1 and the floating object 7. When seawater enters the main body 1, the filtering material 18 can first filter out impurities larger in size (or volume). In this embodiment, there are four sets of centrifugal fans 5 and two sets of pressurizing fans 6 for enhancing the desalinating effect.

Figure 5:
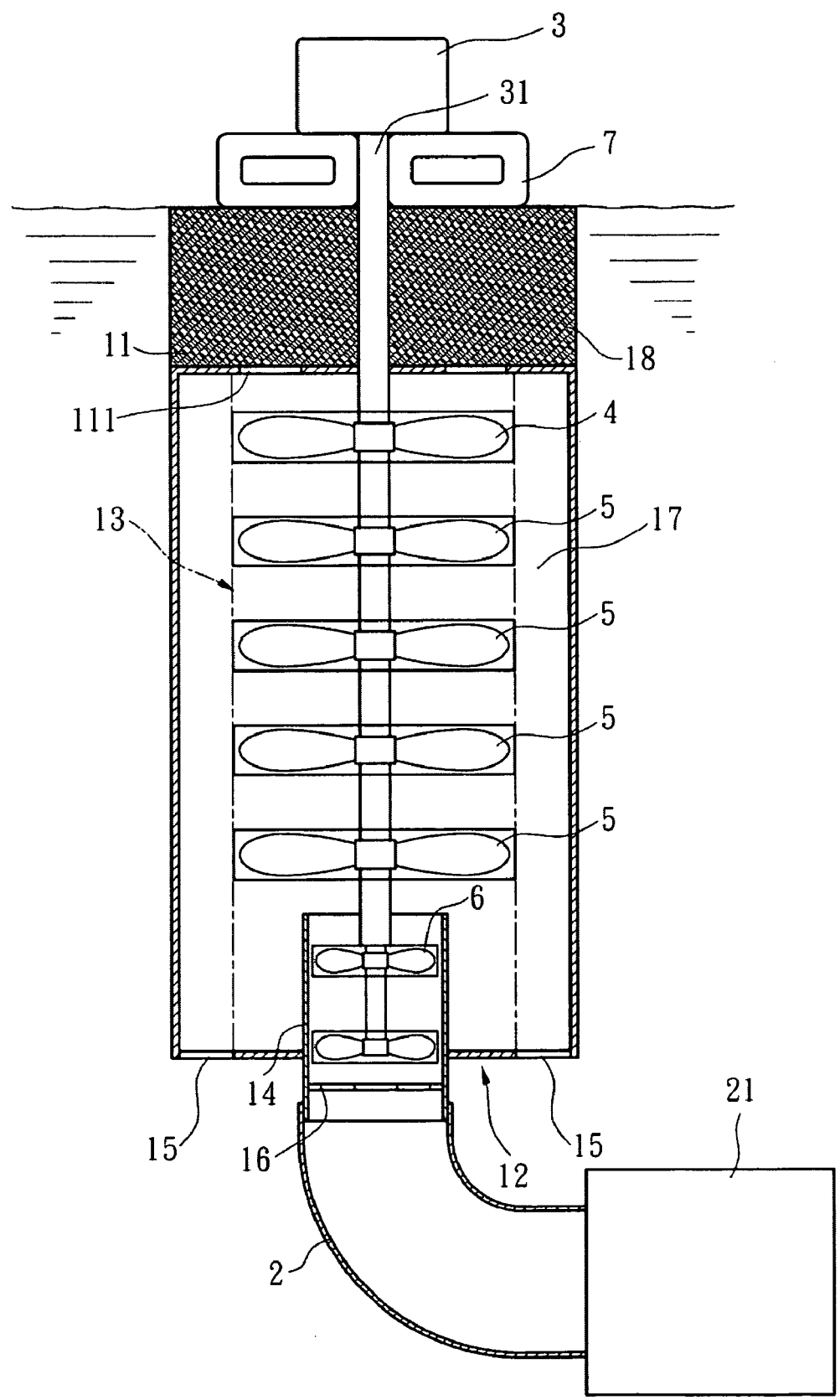
FIG. 5 is a schematic planar view of the third embodiment of the invention.
Figure 6:
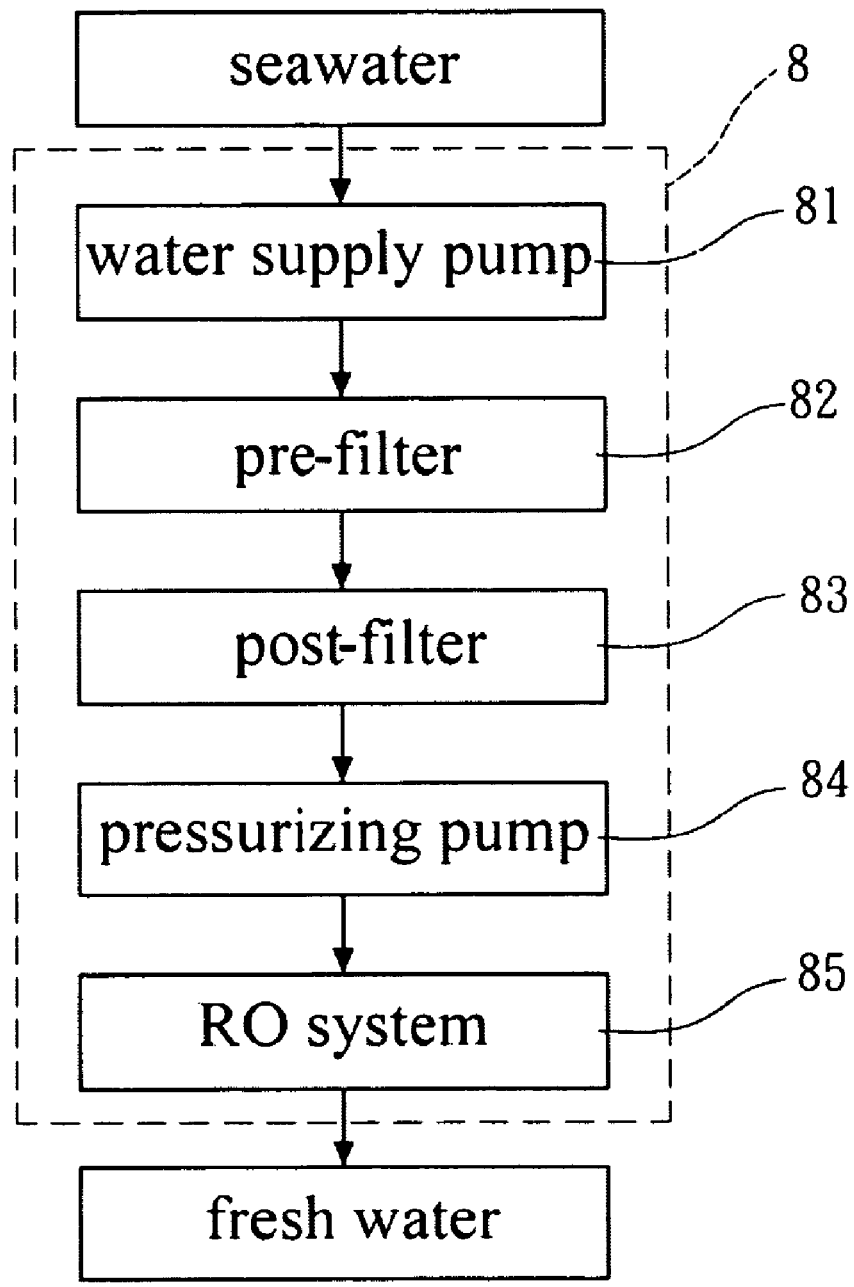
FIG. 6 is the flowchart of a conventional seawater desalination.
Figure 7:
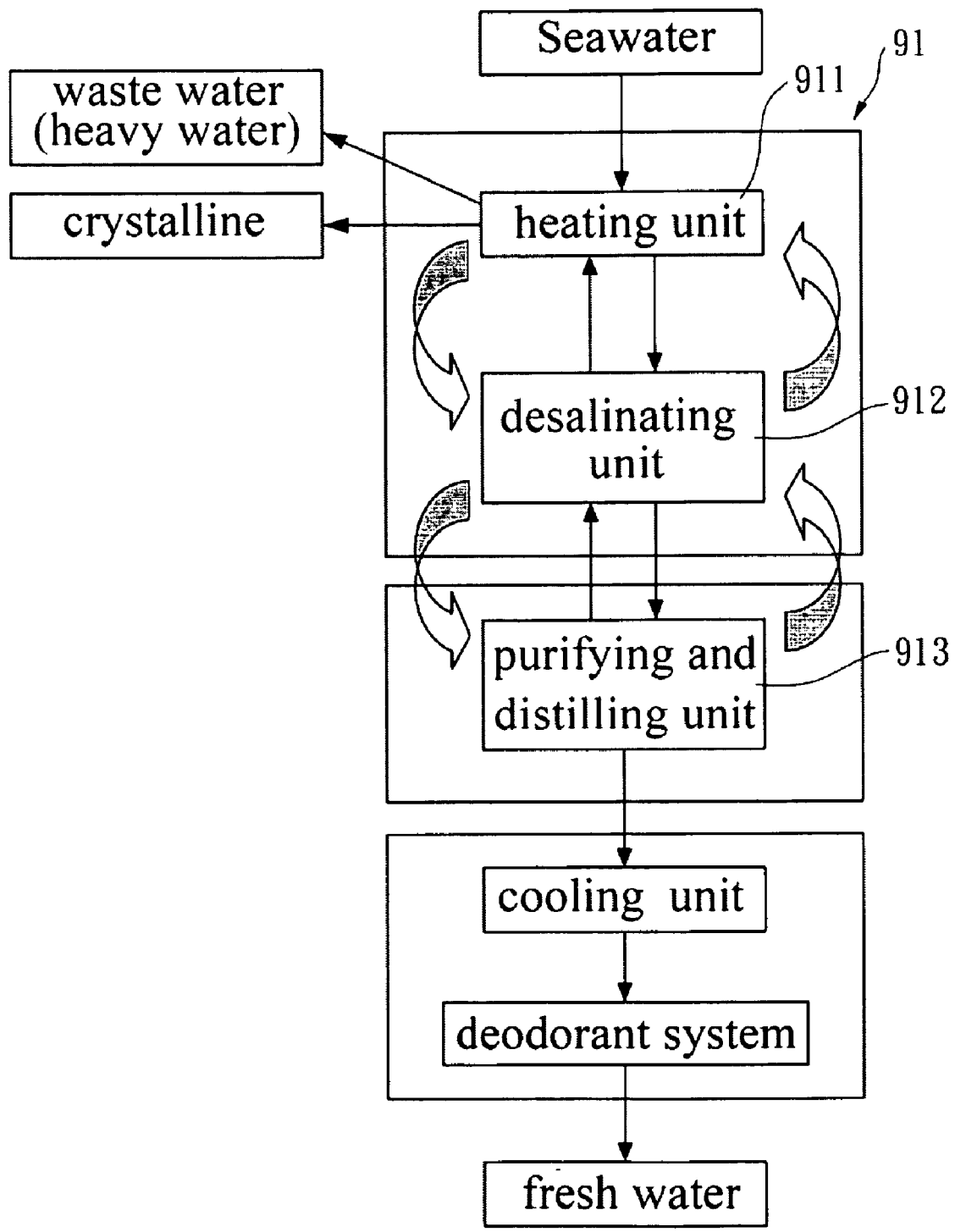
FIG. 7 is the flowchart of another conventional seawater desalination.
Figure 8:
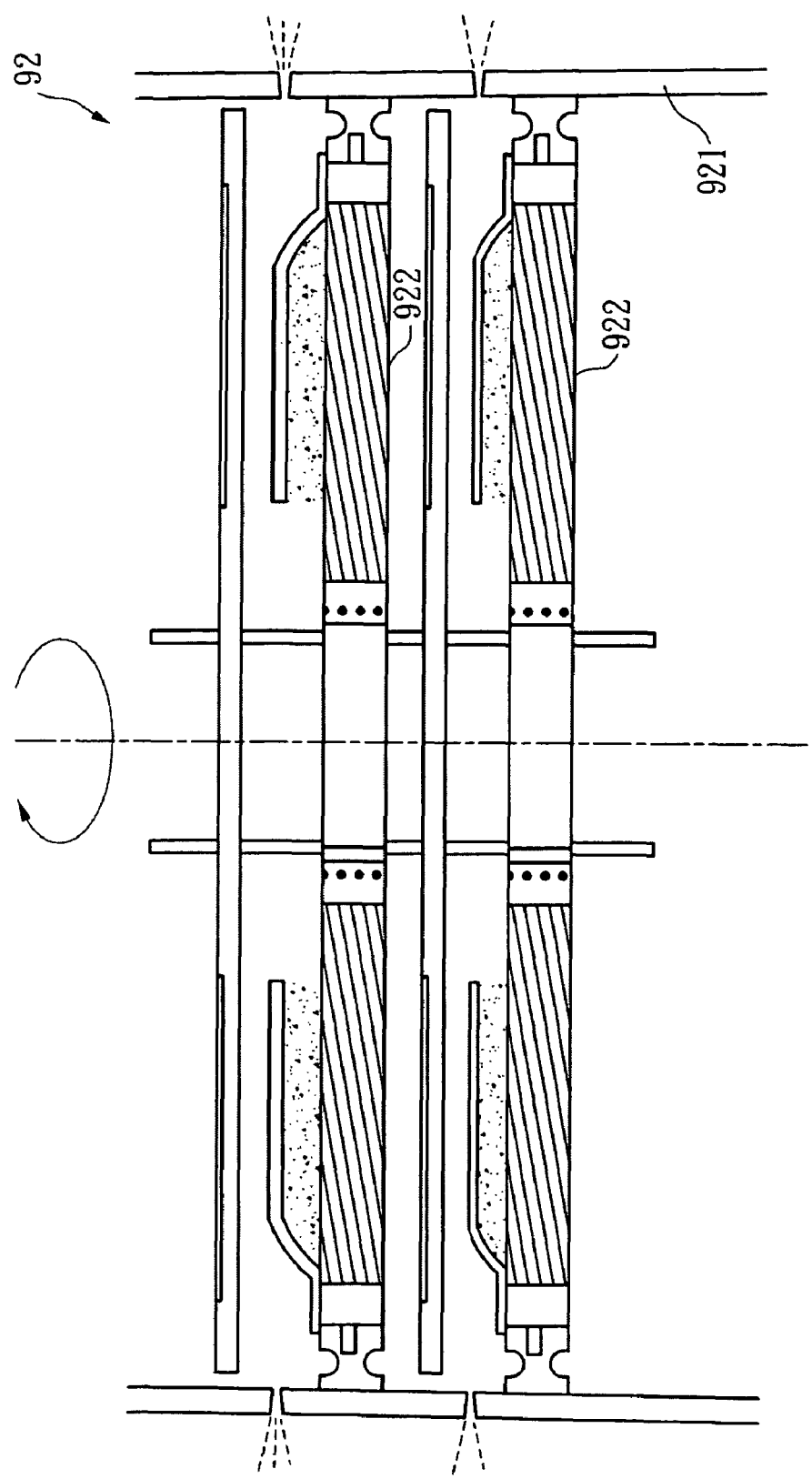
FIG. 8 shows the structure of yet another conventional desalinating device.

Please refer to FIG. 5 for a third embodiment. It differs from the second embodiment in the following aspects. In addition to the structure disclosed in the second embodiment, the main body 1 further has an RO device 21 for fresh water to flow through for second filtering. This part belongs to the prior art and is not further described herein. The effect of the RO device 21 can further filter out tiny impurities in the fresh water coming out of the main body 1.

Although the invention has been described with reference to specific embodiments, this description is not meant to be construed in a limiting sense. Various modifications of the disclosed embodiments, as well as alternative embodiments, will be apparent to people skilled in the art. Therefore, it is contemplated that the appended claims will cover all modifications that fall within the true scope of the invention.

What is claimed is:

1. A seawater filter, comprising:
    a main body, which is hollow and has a first end surface and a second end surface, the first end surface, the second end surface, and the main body forming an accommodating space in the main body, the first end surface has at least one seawater inlet, a hollow duct is disposed at the center of the second end surface and extends into the accommodating space, the second end surface has at least one seawater outlet, the duct has at least one fresh water outlet for filtered fresh water to flow out of the main body, and a fresh water pipeline is connected to the duct and in fluid communications with the duct;

a driving unit disposed on the outer side of the first end surface of the main body, wherein a rotating axis protrudes from the driving unit into the accommodating space of the main body, the rotating axis is provided with at least one pumping fan, at least one centrifugal fan, and at least one pressurizing fan, the at least one pumping fan draws and guides seawater to enter the accommodating space via the at least one seawater inlet, the at least one centrifugal fan throws out impurities whose densities are larger than seawater, the at least one pressurizing fan is disposed in the duct for processing fresh water to flow out via the fresh water pipeline, the maximum outer diameter of the at least one pumping fan and the at least one centrifugal fan is smaller than the inner diameter of the accommodating space of the main body and the space between the maximum outer diameter of the at least one pumping fan and the inner diameter of the accommodating space is defined as a dense seawater region, the dense water region enables dense water with a higher impurity concentration of impurities to flow from top to bottom and leave via the at least one seawater outlet, the minimum outer diameter of the at least one pumping fan and the at least one centrifugal fan is larger than the diameter of the duct, and the maximum outer diameter of the at least one pressurizing fan is smaller than the inner diameter of the duct; and a floating object, which is interposed between the main body and the driving unit for the driving unit to float on the water level, wherein the rotating axis penetrates through the floating object into the accommodating space.

2. The seawater filter of claim 1, wherein there are two seawater inlets.

3. The seawater filter of claim 1, wherein there are two seawater outlets distributed on the second end surface for water with a higher impurity concentration to flow out of the main body.

4. The seawater filter of claim 1, wherein the at least one fresh water outlet is mounted on the duct after the duct protrudes from the main body.

5. The seawater filter of claim 1, wherein the driving unit is a motor.

6. The seawater filter of claim 1, wherein a filtering material for filtering out impurities is interposed between the first end surface and the floating object.

7. The seawater filter of claim 1, wherein there are four sets of centrifugal fans and two sets of pressurizing fans.

8. The seawater filter of claim 1, wherein a reverse osmosis (RO) device is attached to the at least one fresh water outlet for fresh water to flow through and be further filtered.

* * * * *